United States Patent
Jehier

[11] 3,873,409
[45] Mar. 25, 1975

[54] HEAT SEALABLE SHEET MATERIAL

[76] Inventor: André Jehier, 49 120 Chemille, France

[22] Filed: Dec. 13, 1972

[21] Appl. No.: 314,723

[30] Foreign Application Priority Data
Dec. 13, 1971   France .............................. 7144624

[52] U.S. Cl..................... 161/214, 117/75, 117/76, 156/179, 156/309, 161/58, 161/218, 161/231, 161/256
[51] Int. Cl............................................ B32b 15/08
[58] Field of Search ............ 161/58, 59, 82, 89, 91, 161/95, 156, 214; 117/75, 76; 156/179, 309

[56]   References Cited
UNITED STATES PATENTS

| | | |
|---|---|---|
| 2,281,635 | 5/1942 | Strauss................................. 161/95 |
| 2,593,553 | 4/1952 | Francis ................................. 161/95 |
| 2,765,250 | 10/1956 | Williams.............................. 161/214 |
| 2,961,365 | 11/1960 | Sroog................................... 161/214 |
| 3,046,174 | 7/1962 | Brooks et al........................ 161/214 |
| 3,054,703 | 9/1962 | Brasure................................ 161/214 |
| 3,078,201 | 2/1963 | Christie................................ 161/214 |
| 3,531,365 | 9/1970 | Melin..................................... 161/89 |
| 3,572,499 | 3/1971 | Mondano............................ 161/214 |

Primary Examiner—George F. Lesmes
Assistant Examiner—James J. Bell

[57]   ABSTRACT

A non-flammable, heat-sealable sheet material comprised of a layer of man-made fabric laminated to a metal foil via the intermediary of a heat-sealable coating. The fabric is a polyester, the foil is aluminum, the heat-sealable coating material is polyvinyl chloride and a network of intersecting reinforcing threads are disposed between the fabric and foil.

5 Claims, 4 Drawing Figures

3,873,409

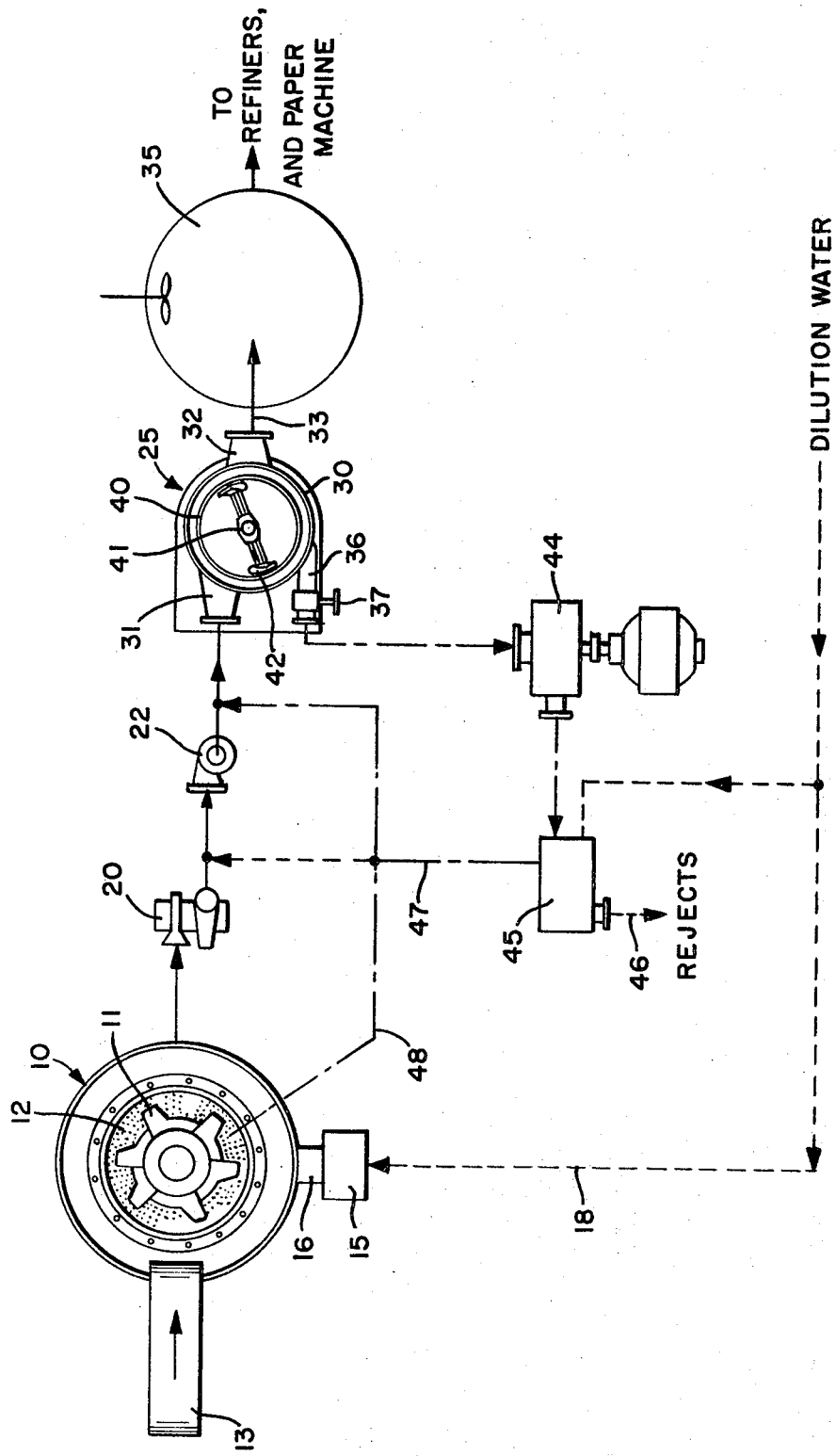

HEAT SEALABLE SHEET MATERIAL

BACKGROUND OF THE INVENTION

1. Field of the Invention

The present invention relates to heat-sealable sheet material and particularly sheet material especially well suited for use in the manufacture of thermal and acoustic insulating pads. More specifically, this invention is directed to the production of heat-sealable material in sheet form. Accordingly, the general objects of the present invention are to provide novel and improved articles and methods of such character.

2. Description of the Prior Art

While not limited thereto in its utility, the present invention is particularly well suited for use in connection with the provision of thermal and acoustic insulation in vehicles and particularly in aircraft. Acoustic and thermal insulation pads for use within aircraft have typically been previously formed by sewing an outer retaining covering of non-flammable fabric about the actual insulating material; the seams thereafter being sealed by the application of a varnish or similar material. Obviously, the use of heat-sealable materials in place of the sewed fabrics of the prior art offers significant economic advantages in the manufacture of insulating pads. However, many heat-sealable materials are flammable and this characteristic prevents the use of such materials for many applications and particularly for use in aircraft.

The production of non-flammable heat-sealable materials in sheet form for use in the formation of insulator pads has previously been considered. The non-flammable heat-sealable sheet materials previously available which were possessed of suitable mechanical properties to permit use as an insulator pad covering, however, have been characterized by the emission of toxic gases when subjected to very high temperatures. The potential emission of toxic gases has prevented the use of such non-flammable materials in environments where there was a fire possibility.

SUMMARY OF THE INVENTION

The present invention overcomes the above briefly discussed and other deficiencies and disadvantages of the prior art by providing a novel non-flammable heat-sealable material which does not emit toxic gases when exposed to elevated temperatures. A sheet material in accordance with the invention comprises a thin layer or sheet of a suitable man-made fabric, for example a polyester, which is bonded to a thin layer or foil of aluminum; there being a reinforcing medium intermediate the thus bonded layers. The sheet material of the present invention is also characterized by the exposed face of the aluminum layer and/or the exposed face of the polyester layer being provided with a coating of a non-flammable heat-sealable material. In a preferred embodiment of the invention the heat-sealable coating is comprised of a thin, light weight polyvinyl chloride layer.

The aforementioned reinforcing medium comprises a network of threads inserted between the polyester and aluminum sheets in order to enhance the strength of the laminate. In accordance with the preferred embodiment of the invention, each thread of the reinforcing medium consists of a pair of twisted strands of different material; one strand being comprised of a polyester and the other strand consisting of a heat-sealable material. The strand of heat-sealable material is preferably comprised of polyvinyl chloride. The present invention also relates to a method for the manufacture of the above-described novel heat-sealable sheet material. In accordance with this method, a thin layer of polyvinyl chloride or equivalent heat-sealable material is applied to both surfaces of a thin aluminum sheet or foil. Thereafter, a reinforcing network of threads, each thread being comprised of strands of a polyester and polyvinyl chloride twisted together, are positioned against a first surface of the coated aluminum. A sheet of a polyester is applied over the reinforcing network and the layers are subjected to heat and pressure to form the desired laminate. During the laminating step the temperature is controlled so as to be maintained at a level lower than the melting temperature of the polyester. For most uses the sheet of polyester will be coated, prior to lamination with the aluminum, on the surface which will be exposed in the end product with a thin layer of polyvinyl chloride.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
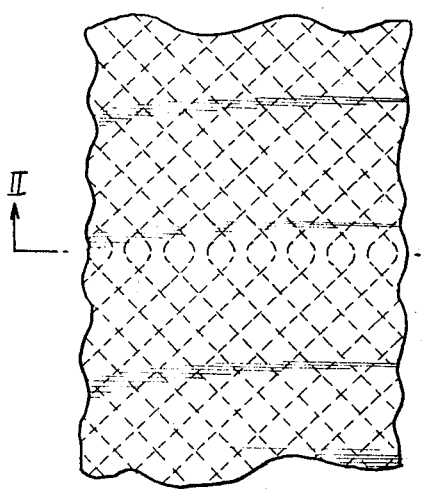
FIG. 1 is a top view of a portion of a sheet of the non-flammable heat-sealable material of the present invention.
Figure 2:
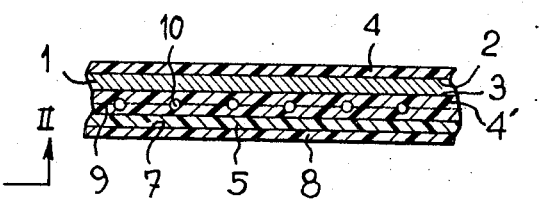
FIG. 2 is an enlarged cross-sectional view, taken along line II—II of FIG. 1, of a preferred embodiment of the sheet material of the present invention.

With reference jointly to FIGS. 1 and 2, in accordance with a preferred embodiment the present invention comprises a sheet 1 of aluminum, for example an aluminum foil, having its oppositely disposed surfaces 2 and 3 coated with thin layers of polyvinyl chloride 4 and 4'. The preferred embodiment of the invention also comprises a sheet of polyester 5 which is, in the manner to be described below, laminated with the aluminum sheet 1. Although not mandatory, the exposed surface 7 of polyester sheet 5 is also provided with a thin polyvinyl chloride coating 8 in the preferred embodiment.

The inwardly facing or uncoated surface of polyester sheet 5 is, as noted above, laminated to the interior facing surface 3 of aluminum sheet 1. The lamination of sheets 1 and 5 is accomplished via the intermediate layer 4' of polyvinyl chloride in the manner to be described below in the discussion of FIG. 3. A network of reinforcing threads 10 is interposed between the aluminum and polyester sheets prior to the lamination step.

Figure 4:
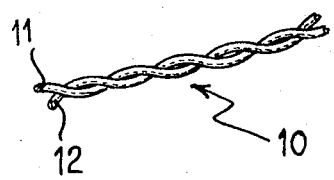
FIG. 4 is a perspective view of a portion of one of the reinforcing threads employed in the invention.

Referring to FIG. 4, it may be seen that the reinforcing threads 10, which would typically be arranged in the manner shown in broken lines in FIG. 1, are each comprised of a plurality of strands. These strands are formed of at least two different materials. In the preferred embodiment, as shown in FIG. 4, threads 10 consist of twisted strands 11 and 12 respectively comprised of polyester and polyvinyl chloride.

Figure 3:
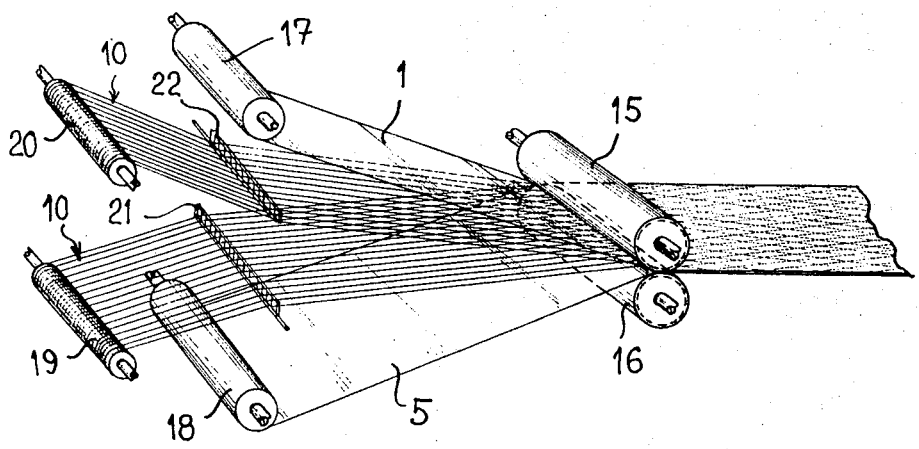
FIG. 3 is a perspective view schematically illustrating the method of producing a non-flammable heat-sealable sheet material in accordance with the invention.

Before discussing a method of manufacture of the heat-sealable sheet material of the present invention, as represented schematically in FIG. 3, it is to be observed that the thickness of the various layers as shown in FIG. 2 is not to scale and is greatly exaggerated. Thus, by way of example, the layers 2, 3 and 8 of polyvinyl chloride are typically very thin and on the order of 2 grams per square meter.

FIG. 3 is a schematic representation of one method for manufacturing the above-described novel heat-sealable sheet material in accordance with the invention. The apparatus of FIG. 3 includes a calender comprising a pair of heating rollers 15 and 16. The outer surfaces of each of rollers 15 and 16 is coated with a layer of self-lubricating material and each roller is heated to a temperature greater than the melting point of polyvinyl chloride but less than the melting point of polyester. Typically, each of rollers 15 and 16 will be heated to a temperature of approximately 180° C.

The feed means for delivering the material to the nip of rollers 15 and 16 comprises a storage roller 17, on which is wound a sheet of aluminum, and a storage roller 18 for a sheet of polyester. The feed mechanism additionally includes bobbins 19 and 20 each of which stores a plurality of threads 10. The threads drawn off of bobbins 19 and 20 pass through combs 21 and 22 which are movable transversely to the direction of movement of the threads; the combs being movable in opposite directions so as to cause the threads to intersect one another.

In operation the rollers 15 and 16 will be rotated at the same peripheral speed and the laminate of FIGS. 1 and 2 is produced by the application of heat and pressure to bond aluminum sheet 1 to polyester sheet 5 via the intermediate of the polyvinyl chloride layer 4 with the reinforcing network of threads 10 being formed between sheets 1 and 5 and enveloped in the polyvinyl chloride layer 4' as shown in FIG. 2. The resulting sheet material, as depicted in FIGS. 1 and 2, is light weight, strong, non-flammable and does not emit toxic gases when subjected to heat.

When it is desired to manufacture insulating pads from the sheet material of the invention either the polyester surface may be welded to the aluminum surface, two aluminum surfaces may be welded together or two polyester surfaces may be interconnected by means known in the art after the insulating material, for example glass wool, has been compressed between two layers of the heat-sealable material.

While preferred embodiments of the sheet material and method of the present invention have been disclosed and described, various modifications and substitutions may be made thereto without departing from the spirit and scope of the invention. Accordingly, it is to be understood that the present invention has been described by way of illustration and not limitation.

What is claimed is:

1. A lightweight, nonflammable, heat-sealable sheet material comprising:
   a first layer of polyester fabric;
   a second layer comprised of a thin aluminum foil, said first and second layers being laminated to one another by the application of heat and pressure;
   a reinforcing network of twisted multi-strand threads disposed between said first and second layers, each thread of said reinforcing network being comprised of a plurality of strands, the strands of said plurality including at least one strand of polyester and one strand of polyvinyl chloride; and
   a coating of heat-sealable polyvinyl chloride on the exposed surface of at least one of said first and second layers.

2. The sheet material of claim 1 wherein said first and second layers are joined by an intermediary of a layer of polyvinyl chloride, said reinforcing network being encapsulated in said intermediate layer.

3. The heat-sealable sheet material of claim 1 wherein said reinforcing network is comprised of a plurality of threads which define a regular intersecting pattern.

4. The sheet material of claim 3 wherein said first and second layers are joined by an intermediary of a layer of polyvinyl chloride, said reinforcing network being encapsulated in said intermediate layer.

5. A method of manufacturing a heat-sealable sheet material comprising the steps of:
   applying a coating of polyvinyl chloride to the oppositely disposed surfaces of a sheet of aluminum;
   applying a reinforcing network of multi-stranded threads to one of said coated aluminum sheet surfaces, the application of said reinforcing network including the twisting together of at least two strands, one of said strands being comprised of polyester and another of said strands being comprised of polyvinyl chloride;
   applying a sheet of polyester over said network of threads; and
   subjecting the composite to a temperature in excess of the melting temperature of polyvinyl chloride and less than the melting temperature of the polyester while simultaneously compressing the laminate.

* * * * *

UNITED STATES PATENT OFFICE
CERTIFICATE OF CORRECTION

Patent No. 3,873,409  Dated March 25, 1975

Inventor(s) Andre Jehier

It is certified that error appears in the above-identified patent and that said Letters Patent are hereby corrected as shown below:

Delete the second sheet of drawing. Delete "Sheet 1 of 2" on the first sheet of drawing.

Signed and Sealed this sixteenth Day of December 1975

[SEAL]

Attest:

RUTH C. MASON
*Attesting Officer*

C. MARSHALL DANN
*Commissioner of Patents and Trademarks*